United States Patent
Vicente Vicente et al.

(10) Patent No.: US 10,185,305 B2
(45) Date of Patent: Jan. 22, 2019

(54) CONTROLLING ACTUATORS

(71) Applicant: Hewlett-Packard Development Company, L.P., Houston, TX (US)

(72) Inventors: Secundino Vicente Vicente, Sant Cugat del Valles (ES); Yngvar Rossow Sethne, Sant Cugat del Valles (ES); Tuomo Eljas Kaikkonen, Sant Cugat del Valles (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 138 days.

(21) Appl. No.: 15/029,590

(22) PCT Filed: Oct. 17, 2013

(86) PCT No.: PCT/EP2013/071759
§ 371 (c)(1),
(2) Date: Apr. 14, 2016

(87) PCT Pub. No.: WO2015/055249
PCT Pub. Date: Apr. 23, 2015

(65) Prior Publication Data
US 2016/0259326 A1    Sep. 8, 2016

(51) Int. Cl.
*G06F 19/00*     (2018.01)
*G05B 19/414*    (2006.01)
(Continued)

(52) U.S. Cl.
CPC ....... *G05B 19/414* (2013.01); *G05B 19/0428* (2013.01); *G05B 23/0294* (2013.01); *G05B 2219/34429* (2013.01)

(58) Field of Classification Search
None
See application file for complete search history.

(56) References Cited

U.S. PATENT DOCUMENTS

| 5,422,553 A | 6/1995 | MacLennan et al. |
| 5,796,221 A * | 8/1998 | Cramer ................. B65G 43/02 318/46 |

(Continued)

FOREIGN PATENT DOCUMENTS

| CN | 101340165 | 1/2009 |
| CN | 102710183 | 10/2012 |

(Continued)

OTHER PUBLICATIONS

Obermaier, W., "Decentralized Motor Drive Applications," (Web Page), 2010. Available at: http://www.vincotech.com/en/support/technical-papers/motor-integration/decentralized-motor-drive-applications.html.

(Continued)

*Primary Examiner* — Jason Lin
*Assistant Examiner* — Hung H Dang
(74) *Attorney, Agent, or Firm* — HP Inc. Patent Department

(57) ABSTRACT

A control system for controlling actuators comprises a central processor, a plurality of actuators, and a plurality of servo systems for controlling the respective actuators. Each servo system is operable, independently of the central processor, to control a controlled parameter (Y) in accordance with a reference value (R). The servo systems and the central processor communicate via a non-deterministic communications system. The central processor and the servo systems provide, to the central processor via the non-deterministic communications system, offset signals representing offsets (R−Y) measured by the servo systems between reference R and actual Y values of the controlled parameter. The central processor compares the offsets (R−Y) measured by the respective servo systems one with another.

13 Claims, 2 Drawing Sheets

(51) Int. Cl.
   *G05B 19/042*   (2006.01)
   *G05B 23/02*    (2006.01)

(56) References Cited

U.S. PATENT DOCUMENTS

| | | | |
|---|---|---|---|
| 5,834,916 A * | 11/1998 | Shimogama | G05B 19/231 |
| | | | 318/568.11 |
| 5,947,023 A | 9/1999 | Bohrer et al. | |
| 6,041,705 A | 3/2000 | Lintner | |
| 7,011,511 B2 | 3/2006 | Nishizawa et al. | |
| 2005/0129794 A1 * | 6/2005 | Chao | B29C 45/5008 |
| | | | 425/145 |
| 2005/0234565 A1 | 10/2005 | Marks et al. | |
| 2006/0267537 A1 * | 11/2006 | Baumann | G05B 19/409 |
| | | | 318/632 |
| 2008/0218116 A1 * | 9/2008 | Maeda | G05B 19/19 |
| | | | 318/571 |
| 2008/0313426 A1 * | 12/2008 | Terayama | G05B 19/0428 |
| | | | 712/29 |
| 2010/0332032 A1 | 12/2010 | Moriyama et al. | |
| 2014/0320058 A1 * | 10/2014 | Takagi | H02K 41/031 |
| | | | 318/632 |

FOREIGN PATENT DOCUMENTS

| | | | |
|---|---|---|---|
| DE | 202012101936 | 11/2012 | |
| EP | 2286996 | 2/2011 | |
| JP | H06304814 A * | 11/1994 | B23G 1/16 |
| WO | WO-9725661 | 7/1997 | |

OTHER PUBLICATIONS

PCT Search Report and Written Opinion, dated Jun. 25, 2014, PCT/EP2013/071759, Hewlett-Packard Development Company, Ltd., European Patent Office, 9 pages.

* cited by examiner

CONTROLLING ACTUATORS

CROSS-REFERENCE TO RELATED APPLICATION

This application is a U.S. National Stage Application of and claims priority to International Patent Application No. PCT/EP2013/071759, filed on Oct. 17, 2013, and entitled "CONTROLLING ACTUATORS," which is hereby incorporated by reference in its entirety.

BACKGROUND

A system, for example a printer, may have a plurality of actuators, for example motors. The control of all the actuators is done by a central or main processor which is coupled to the actuators by a bus system. That has good synchronization capabilities because all the servo checks are done by the main processor. But, as the number of motors to be controlled increases, the resources consumed at the central processor can be excessive. Centralized control is thus suitable for systems with a small number of actuators.

DETAILED DESCRIPTION

Features and advantages of the invention will become apparent from the following description of preferred examples of the invention, given by way of example, which is made with reference to the accompanying drawings.

In a system having a plurality of actuators, a central processor is provided to control and synchronize the operation of the actuators via a communications system. For example, the movement of a printer hardware component has to be done by more than one actuator, for example a motor, because of the weight or size of the component. The movement of all involved actuators has to be synchronized to avoid forcing or breaking a mechanical part and to perform critical movements of the components with high accuracy. It is desirable to decentralize the control of the actuators to allow control of larger numbers of actuators but there is a need to centrally monitor the operation of the actuators to ensure the movement and positions of the actuators are synchronized. However in a decentralized system there is a problem monitoring the real positions of the actuators due the latency of the communications system.

Figure 1:
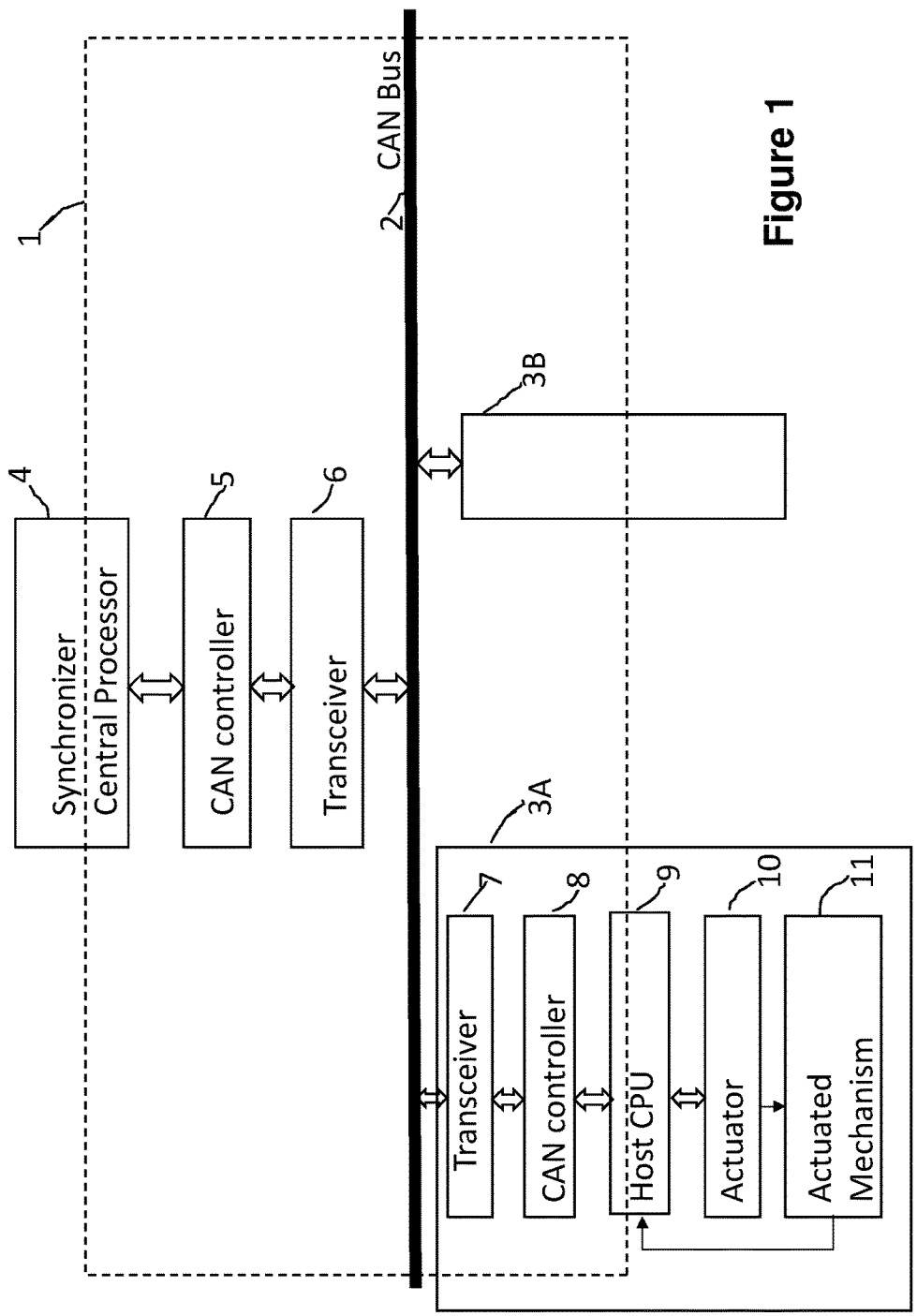
FIG. 1 is an example schematic block diagram of a system of actuators in accordance with an implementation.

The system of FIG. 1 comprises a central processor 4 linked by a non-deterministic communications system 1 to a plurality of actuators, in this example servo systems 3A, 3B. A non-deterministic communications system is one in which the timing of signalling over the system is not defined. An example of such a system is the CAN bus system and the system of FIG. 1 uses a CAN bus system.

The CAN bus system comprises a bus 2. The servo systems 3A, 3B and the central processor 4 are coupled to the bus 2 by interfaces, each of which comprises a transceiver 6 and a CAN controller 5. The central processor is coupled to the bus 2 by CAN controller 5 and transceiver 6.

The servo system 3A is coupled to the bus 2 by CAN controller 8 and transceiver 7. The servo system 3B is identical to servo system 3A.

The servo system 3A comprises an actuator 10, in this example a motor, and a host CPU 9 which controls the actuator 10. The actuator 10 moves an actuated mechanism 11, in this example a component of a printer. The servo system 3B is identical and, in this example, moves the same component of the printer as the servo system 3A.

The central processor 4 programs the host CPUs 9 of the servo systems 3A, 3B by sending instructions to the host CPUs 9 via the CAN bus system 2. The instructions provide reference values R to the servo systems 3A and 3B which define the desired output values Y, in this example position and/or velocity, of the systems. The reference values define, for example, the desired trajectory, for example position and/or velocity, of movement of the actuators to actuate the actuated mechanism 11 in a desired way. Once the host CPUs 9 are programmed, the servo control of the actual movement is controlled by the host CPUs 9. Each host CPU 9 monitors the actual trajectory and stops movement if the actual trajectory differs from the desired trajectory by more than a predetermined amount.

When the central processor 4 wants to start the movement, it broadcasts a "start" signal to all the remote host CPUs 9.

The host CPUs 9 transmit to the central processor 4 signals representing the offset (difference) between the actual Y and desired R values of the output of the actuators. In this example the signals represent the difference, or offset, R−Y between the reference and actual values. The central processor 4 monitors the offsets. In one example, the central processor 4 compares the offsets of the respective actuators. If the offsets are the same within a preset tolerance, no action is needed. If the offsets differ one from another by more than a predetermined threshold amount, the central processor 4 stops movement of all the actuators.

The offsets R−Y of the actuators are monitored and compared by the central processor at a frequency which is low compared to the frequency of measuring the servo error in the servo systems 3. The frequency of monitoring the offsets R−Y and comparing the offsets is a matter of choice by the designer of the system, For example, if the group of actuators is slowly moving a large actuated mechanism, the offsets may be monitored once per second, whereas they would be monitored more frequently if moving a smaller actuated mechanism more quickly.

By way of further explanation, actuators mechanically degrade over time so the offset between the actual and desired positions may increase. To some extent, the servo control provided by the host CPU 9 maintains the desired position of the actuated mechanism 11 even as the actuator degrades. Also, identical motors are likely to degrade in similarly. However, if degradation is not similar, movement of the actuated mechanism and/or the actuators may involve excessive force. Monitoring the difference between the offsets of the respective servo systems by the central processor allows unequal degradation to be detected. The central processor 4 monitors the offset R−Y measured by each servo system, not absolute position. The central processor 4 may send a request to each servo system requesting the servo system to provide the offset R−Y or each servo system may send the offset to the central processor without such a request.

Figure 2:
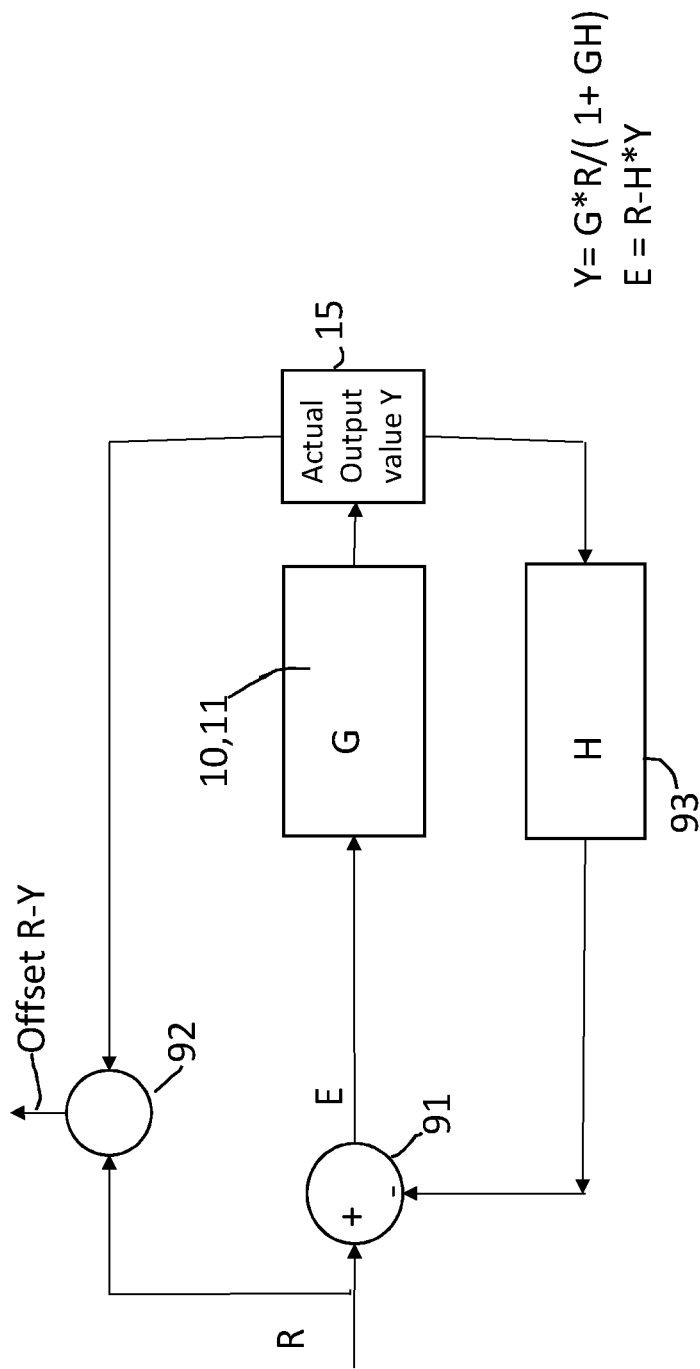
FIG. 2 is an example simplified block diagram of a servo system comprising an actuator in accordance with an implementation.

Referring to FIG. 2, which is a simplified block diagram of a servo system, the servo system operates to minimise the servo error E, which is the difference between the desired or reference value R applied to the system and the fed-back actual value H*Y, where Y is the actual output value of the system, and H is the transfer function of the feedback path. R and Y may be position or velocity for example. Some servos may control both position and velocity. The desired value R is supplied to the host CPU 9 by the central processor 4. The servo systems, once programmed, operate to minimise the servo error E independently of the central processor 4.

The servo system has a forward path G which comprises the actuator 10 and may also comprise the actuated mechanism 11. A sensor 15 senses the actual value Y of the output of the system. The value Y is fed-back to a controller 93 having a transfer function H. A subtractor 91 calculates the servo error E=R−H*Y. The offset R−Y is calculated by a subtractor 92 for provision to the central processor 4 via the non-deterministic communications system. Whilst for ease of explanation the controller 93 and subtractors 91 and 92 are shown as hardware blocks, in this example they are implemented by software run by the host CPU 9. Each of the individual servo systems may be programmed to monitor the value of its own offset R−Y and, if the value exceeds a predetermined amount, to stop movement of its actuator. The central processor receives the offset value, determines it is too high and signals the other servo(s) to stop movement. (It should be noted that the offset (R−Y) is different to the servo error E=R−H*Y.)

The communications system 1 is non-deterministic. By using the host CPUs 9 to control the actuators, the servo control of each actuator, which requires precise measurement at high frequency, does not require use of the communications system 1. Use of the host CPUs 9 also allows short signal paths, i.e. short cables, to the actuators, with reduced noise and lower cost.

The central processor 4 processor receives the offset values R−Y at low frequency, and with indeterminate timing, over the CAN bus system 1.

Because the servo control of the actuators is performed locally by the host processors independently of the central processor, (once the host processors have been programmed by it), the scalability of the control system is high: adding more servo systems and actuators has a small impact on the central processor.

The foregoing description assumes that the actuators 3A, 3B actuate the same single printer component. The printer may comprise other components each actuated by one or more other actuators. The central processor 4 co-ordinates the control of the movement of all the printer components by the actuators. The system may have several synchronized group of actuators. That means that all the actuators will move at the same time and with the same velocity. The system may have two or more independent groups of one or more synchronized motors. All the independent groups maybe controlled by the central processor 4.

The above examples are to be understood as illustrative examples of the invention. Further examples of the invention are envisaged. Whilst the example described above refers to a printer and control of components of the printer, the invention is not limited to printers and may be applied to other mechanisms. Whilst the example described above uses a CAN bus system, other non-deterministic communications systems may be used, for example Ethernet.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A control system for controlling actuators, the system comprising:
   a central processor;
   a plurality of actuators;
   a plurality of servo systems for controlling the respective actuators;
   each servo system being operable, independently of the central processor, to control an actual value of a controlled parameter in accordance with a reference value and a servo error that is a function of the reference value, the actual value and a transfer function of the servo system; and
   a non-deterministic communications system via which the plurality of servo systems and the central processor communicate,
   wherein the plurality of servo systems provide signals representing offsets as differences between the reference values and the actual values measured by the plurality of servo systems to the central processor via the non-deterministic communications system, and the central processor compares the offsets measured by the respective servo systems to determine degradation of the respective servo systems;
   wherein a servo system of the plurality of servo systems provides an offset value to the central processor via the non-deterministic communications system at a frequency which is low compared to a rate of monitoring servo error in the servo system, wherein timing of providing the offset value via the non-deterministic communications system is undefined;
   wherein the central processor stops operation of the plurality of actuators if a difference between compared offsets exceeds a predetermined threshold value.

2. The control system according to claim 1, wherein the servo system comprises a programmable host processor for controlling an actuator associated with the servo system, and the central processor programs each host processor via the communications system to define the control of the said controlled parameter by the servo system in accordance with the reference value.

3. The control system according to claim 1, wherein the non-deterministic communications system is a CAN bus system or an Ethernet communications system.

4. The control system according to claim 1, wherein each servo system provides offset values to the central processor at a frequency which is low compared to a respective rate of monitoring servo error in the servo system.

5. The control system according to claim 1, wherein the central processor requests provision of the offset values by the servo systems.

6. The control system according to claim 1, wherein the central processor stops operation of the plurality of actuators if the said offset measured by at least one of the servo systems exceeds a predetermined limit value.

7. The control system according to claim 1, wherein the central processor controls initiation of actuation of the plurality of actuators by the plurality of servo systems.

8. The control system according to claim 1, wherein the plurality of actuators act on the same component of a machine.

9. The control system according to claim 1, wherein the plurality of actuators act on respective components of a machine.

10. The control system according to claim 8, wherein the machine is a printer.

11. A method of controlling actuators in a system comprising:
- a central processor,
- a plurality of actuators,
- a plurality of servo systems for controlling the respective actuators, and
- a non-deterministic communications system via which the servo systems and the central processor communicate, wherein timing of signaling over the non-deterministic communications system is undefined,
- wherein each servo system controls, independently of the central processor, an actual value of a controlled parameter in accordance with a reference value, and
- the servo systems provide signals representing offsets between reference and actual values to the central processor via the non-deterministic communications system, and
- the central processor compares the offsets measured by the respective servo systems to detect unequal degradation of the plurality of servo systems;
- wherein a servo system of the plurality of servo systems controls a servo error which is a function of the reference value, the actual value and a transfer function of the servo system and provides an offset which is a difference between the reference and the actual value to the central processor with indeterminate timing and at a frequency which is low compared to a rate of monitoring of the servo error in the servo system;
- wherein the central processor stops operation of the plurality of actuators if a difference between compared offsets exceeds a predetermined threshold value.

12. The method according to claim 11, wherein each servo system stops operation if the actual value it controls differs from the reference value by more than a preset amount.

13. The method according to claim 11, wherein each servo system controls a respective servo error and provides a respective offset to the central processor.

* * * * *